US012065884B2

(12) United States Patent
Cai et al.

(10) Patent No.: US 12,065,884 B2
(45) Date of Patent: Aug. 20, 2024

(54) MANUFACTURE OF ROLLER CONE DRILL BITS

(71) Applicants: King Dream Public Limited Company, Wuhan (CN); Taurex Drill Bits, LLC, Norman, OK (US)

(72) Inventors: Yongzhong Cai, Wuhan (CN); Dongze Yang, Wuhan (CN); Yuan Yi, Wuhan (CN); Dustin Lyles, Norman, OK (US); Terry Vance Morris, Tuttle, OK (US)

(73) Assignee: Taurex Drill Bits, LLC, Norman, OK (US)

( * ) Notice: Subject to any disclaimer, the term of this patent is extended or adjusted under 35 U.S.C. 154(b) by 356 days.

(21) Appl. No.: 17/541,486

(22) Filed: Dec. 3, 2021

(65) Prior Publication Data

US 2022/0178210 A1 Jun. 9, 2022

Related U.S. Application Data

(60) Provisional application No. 63/120,792, filed on Dec. 3, 2020.

(51) Int. Cl.
*E21B 10/52* (2006.01)
*B23K 31/02* (2006.01)
*B23K 101/00* (2006.01)

(52) U.S. Cl.
CPC ............ *E21B 10/52* (2013.01); *B23K 31/02* (2013.01); *B23K 2101/002* (2018.08)

(58) Field of Classification Search
CPC .................... E21B 10/52; B23K 2101/002
See application file for complete search history.

(56) References Cited

U.S. PATENT DOCUMENTS

| | | | | | |
|---|---|---|---|---|---|
| RE25,684 | E | * | 11/1964 | Coulter, Jr. | ............. B23P 15/28 |
| | | | | | 76/108.1 |
| 3,223,188 | A | * | 12/1965 | Coulter, Jr. | ............. E21B 10/16 |
| | | | | | 148/319 |
| 4,037,300 | A | * | 7/1977 | Garner | ..................... F16C 33/24 |
| | | | | | 29/898.066 |
| 4,593,776 | A | * | 6/1986 | Salesky | ................... E21B 10/46 |
| | | | | | 175/375 |
| 4,679,640 | A | * | 7/1987 | Crawford | ................. C21D 9/22 |
| | | | | | 175/425 |
| 7,210,377 | B2 | * | 5/2007 | Griffo | .................. C23C 30/005 |
| | | | | | 76/108.2 |
| 9,988,854 | B2 | * | 6/2018 | Gallifet | ..................... C23C 8/20 |
| 2017/0328135 | A1 | * | 11/2017 | Gallifet | ..................... C23C 8/20 |
| 2020/0291726 | A1 | * | 9/2020 | Lyles | ..................... E21B 29/00 |

* cited by examiner

*Primary Examiner* — Shane Bomar
(74) *Attorney, Agent, or Firm* — Vorys, Sater, Seymour and Pease LLP

(57) ABSTRACT

A method of manufacturing a roller cone includes machining a cone blank and thereby defining one or more land surfaces and one or more insert grooves on the cone blank, surface hardening the cone blank, and milling a plurality of recesses into at least one of the one or more land surfaces. The method further includes subjecting the cone blank to a quenching process, forming an insert hole at each recess, and inserting an insert into each insert hole.

21 Claims, 4 Drawing Sheets

MANUFACTURE OF ROLLER CONE DRILL BITS

BACKGROUND

There is a wide variety of roller cone drill bits that can be used to drill wellbores, or alternatively drill through various downhole obstructions or tools within a wellbore, such as frac plugs. Roller cone drill bits, alternately referred to as "rotary" bits, "rock" bits, or "Tri-Cone™" bits, typically include a bit body with three support arms extending therefrom, and each support arm includes a respective cone assembly rotatably mounted thereto. A plurality of cutting elements or cutting structures, such as compacts, inserts, milled teeth, and welded compacts, are typically attached to each cone of the roller cone drill bit. The cutting elements and cutting structures cooperatively operate to shear and crush adjacent portions of a subterranean formation, or alternatively crush and mill through downhole obstructions.

Whether drilling a subterranean formation or wellbore obstructions, roller cone drill bits are subjected to extreme environments downhole that cause significant wear and tear (or damage) to specific portions of the bit. Improved methods of manufacturing roller cone drill bits is, therefore, desirable to prolong the life of such drill bits.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to the manufacture of drill bits and, more particularly, to methods of manufacturing roller cones for roller cone drill bits to improve durability and prolong bit life.

Figure 1:
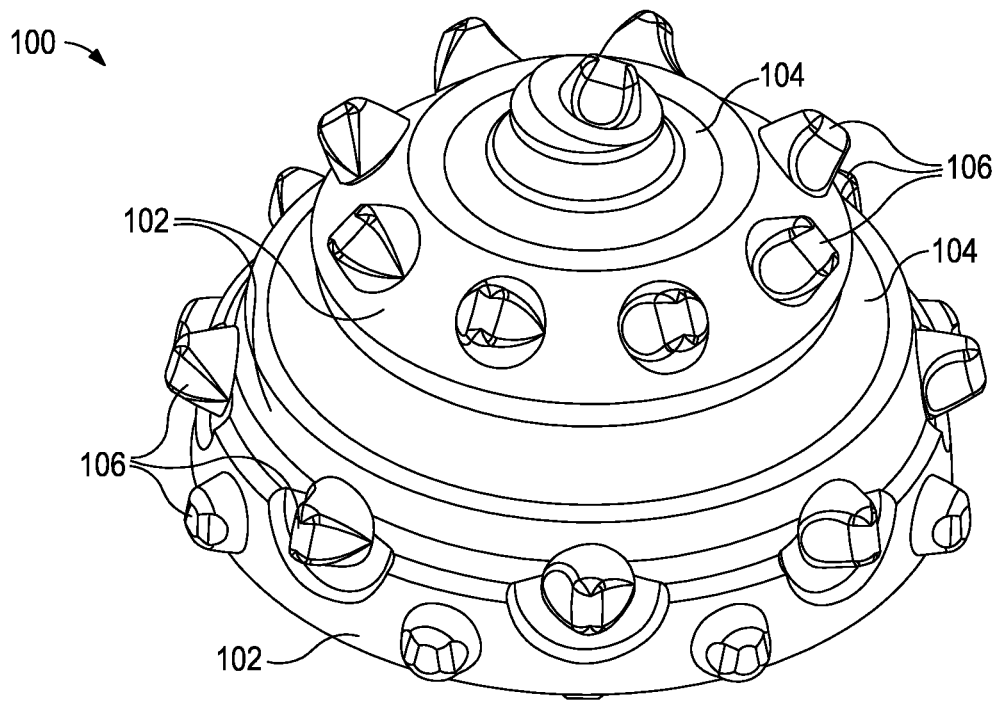
FIG. 1 is an isometric side view of a prior art cone for a conventional roller cone drill bit.

FIG. 1 is an isometric view of a prior art roller cone 100 that may be used in a conventional roller cone drill bit. As illustrated, the roller cone 100 provides or defines a plurality of land surfaces 102 and one or more insert grooves 104 extending about the circumference of the roller cone 100. A plurality of cutting elements or "inserts" 106 may be attached to the roller cone 100 at the land surfaces 102 and spaced about the circumference of the roller cone 100. The insert grooves 104 provide a void or race location where inserts attached to adjacent roller cones (not shown) are able to traverse (travel through) without contacting the inserts 106 of the roller cone 100.

The inserts 106 may be formed from a wide variety of hard materials, such as tungsten carbide. The term "tungsten carbide" includes monotungsten carbide (WC), ditungsten carbide ($W_2C$), macrocrystalline tungsten carbide and cemented or sintered tungsten carbide. Examples of hard materials which may be satisfactorily used to form the inserts 106 include various metal alloys and cermets, such as metal borides, metal carbides, metal oxides and metal nitrides.

Figure 2A:
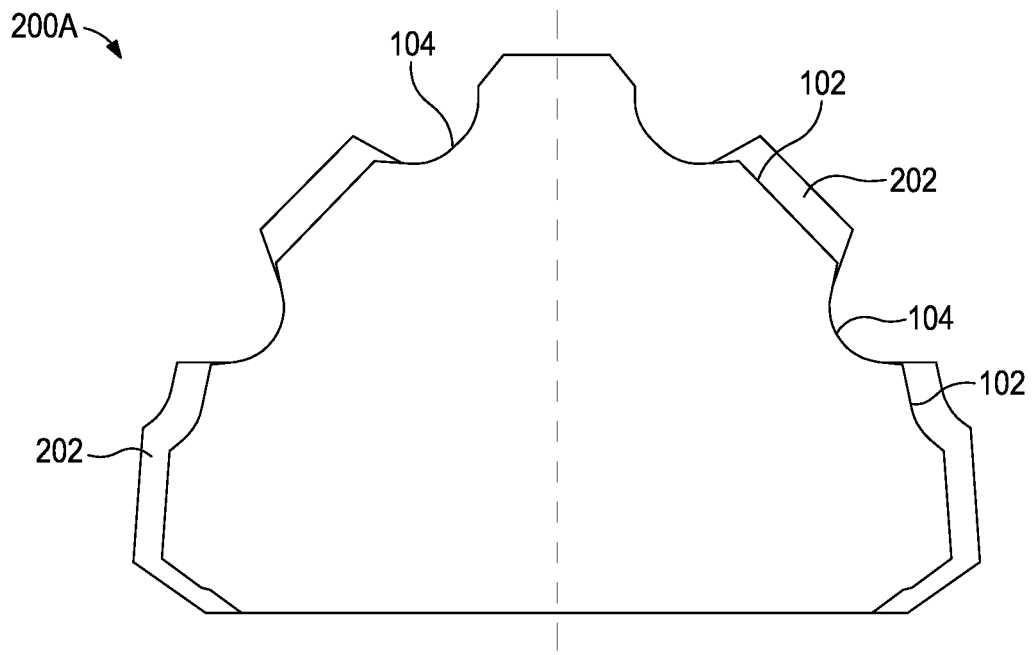
FIGS. 2A and 2B are schematic side views of cone blanks that demonstrate example manufacturing of prior art roller cones.
Figure 2B:
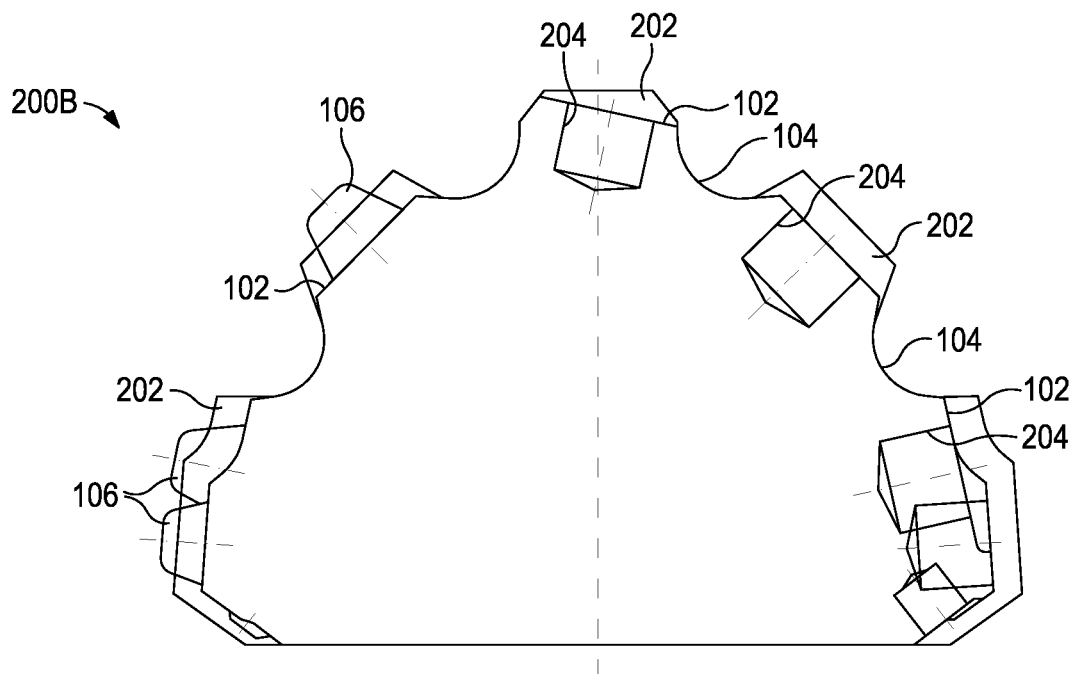

FIGS. 2A and 2B are schematic side views of cone blanks 200A and 200B, respectively, demonstrating example manufacturing of a prior art roller cone. The cone blanks 200A,B may be similar in some respects, and each may form the base structure for the roller cone 100 of FIG. 1. The cone blanks 200A,B are each forged and subsequently roughly machined to a general geometry for the roller cone. The areas for the insert grooves 104 may be additionally machined such that little or no finish machining will subsequently be required at those locations. In contrast, a layer of material 202 will remain at locations on the cone blanks 200A,B that will eventually form the land surfaces 102 in the finished product.

The cone blanks 200A,B are then surface hardened to increase the surface hardness of the entire structure. Example surface hardening processes include carburization, nitriding, cyaniding, induction hardening, flame hardening, laser hardening, or any combination thereof. Following surface hardening, the cone blanks 200A,B are finish machined by milling away the layer of material 202. In this process, the layer of material 202 is removed until reaching the final geometry for the land surfaces 102 about the entire circumference of the cone blanks 200A,B. The cone blanks 200A,B are then quenched to increase the overall hardness of the structure.

As best seen in FIG. 2B, insert holes 204 may then be selectively drilled into the cone blanks 200A,B at the land surfaces 102. To complete the roller cone for operation, an insert 106 is subsequently received within each insert hole 204, such as via a press-fit engagement, welding, brazing, or any combination thereof.

Milling the layer of material 202 at the land surfaces 102 before quenching the structure allows for easier milling and drilling of the insert holes 204. More specifically, following a quenching process, the surface hardness of the land surfaces 102 will be extremely high, thus making the process of drilling the insert holes 204 through a quenched surface hardened layer costly and time-consuming. Moreover, in order to obtain the necessary retention force to hold the inserts 106 within the insert holes 204, each insert hole 204 must have a high level of dimension accuracy, shape accuracy, and surface roughness. If the insert holes 204 were drilled before quenching, the dimension accuracy, shape accuracy, and surface finish of the inserts holes 204 following heat treatment could not be guaranteed, which could result in lost inserts 106 during operation due to insufficient retention force. Furthermore, a surface hardened and quenched insert hole 204 is highly prone to cracking upon press-fitting inserts 106 into the corresponding insert hole 204.

The foregoing conventional manufacturing process for roller cones results in a substantive difference between the hardness of the insert grooves 104 and the hardness of the land surfaces 102. Consequently, roller cones manufactured via the foregoing process can experience significant wear on the land surfaces 102 where the inserts 106 are press fit into the cone body. The land surfaces 102 will typically undergo more surface erosion during downhole operation, thereby gradually exposing the inserts 106 and decreasing the retention forces on the inserts 106. This can eventually lead to a higher susceptibility for losing inserts 106 during use.

Figure 3:
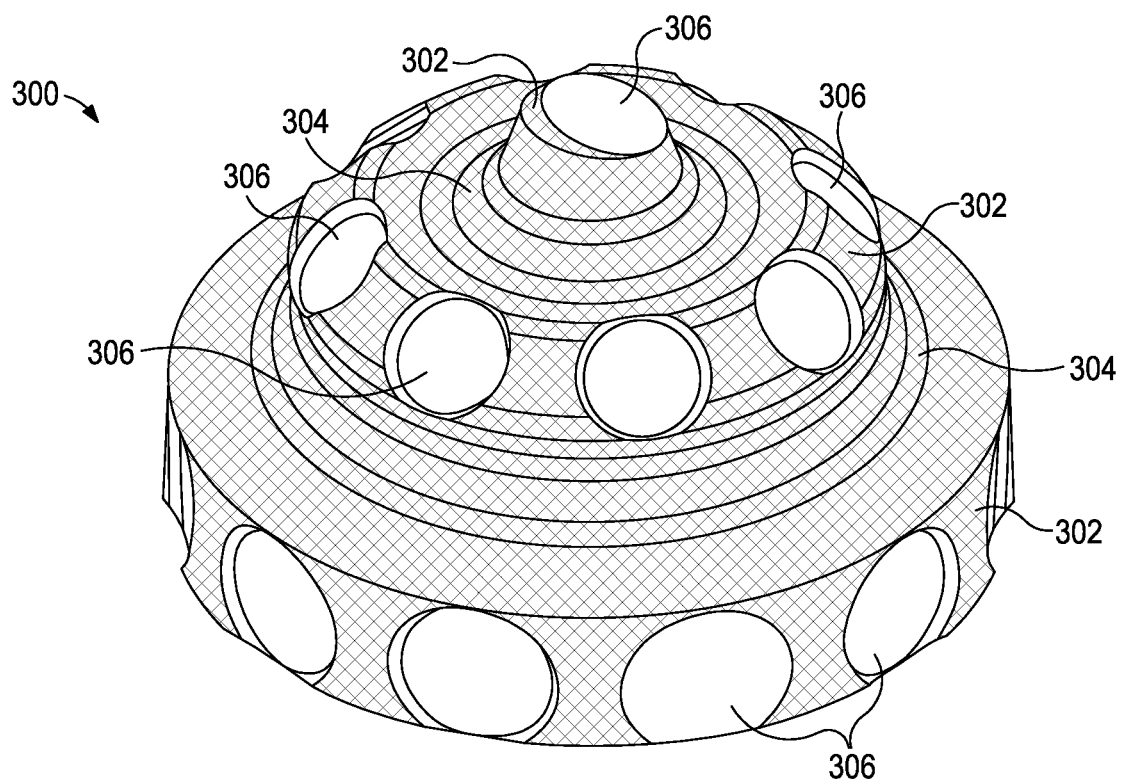
FIG. 3 is an isometric side view of an example cone blank that demonstrates one or more of the principles of the present disclosure.

FIG. 3 is an isometric side view of an example cone blank 300 that may demonstrate one or more of the principles of the present disclosure. The cone blank 300 may be similar in some respects to the cone blanks 200A,b of FIGS. 2A-2B, and therefore may be best understood with reference thereto. The presently disclosed methods of manufacturing the cone blank 300 may result in roller cones with insert lands having a hardness similar to the hardness of the insert grooves, thus resulting in the insert lands lasting longer during use.

As illustrated, the roller cone 300 provides or defines a plurality of land surfaces 302 and one or more insert grooves 304 extending about the circumference of the roller cone 300. Similar to the insert grooves 104 of FIGS. 1 and 2A-2B, the insert grooves 304 provide a void or race location where inserts attached to adjacent roller cones (not shown) are able to traverse (travel through) without contacting the inserts of the roller cone 300.

According to the presently disclosed embodiments, the cone blank 300 may first be finish-machined down to the land surfaces 302 and the insert grooves 304. The cone blank 300 may then be surface hardened to increase the surface hardness of the entire cone blank 300. As provided above, example surface hardening processes include, but are not limited to, carburization, nitriding, cyaniding, induction hardening, flame hardening, laser hardening, or any combination thereof.

Following surface hardening of the cone blank 300, a plurality of recesses 306 may be strategically milled into each land surface 302, thereby removing the surface hardened layer of material at those locations. Each recess 306 may be milled (e.g., using a five-axis mill) at corresponding locations where an insert will eventually be attached to the cone blank 300. As illustrated, each recess 306 may comprise a circular, flat depression extending a short distance into the cone blank 300. Once the recesses 306 are formed, the cone blank 300 may then be subjected to a quenching process to increase the overall hardness of the entire structure.

Figure 4:
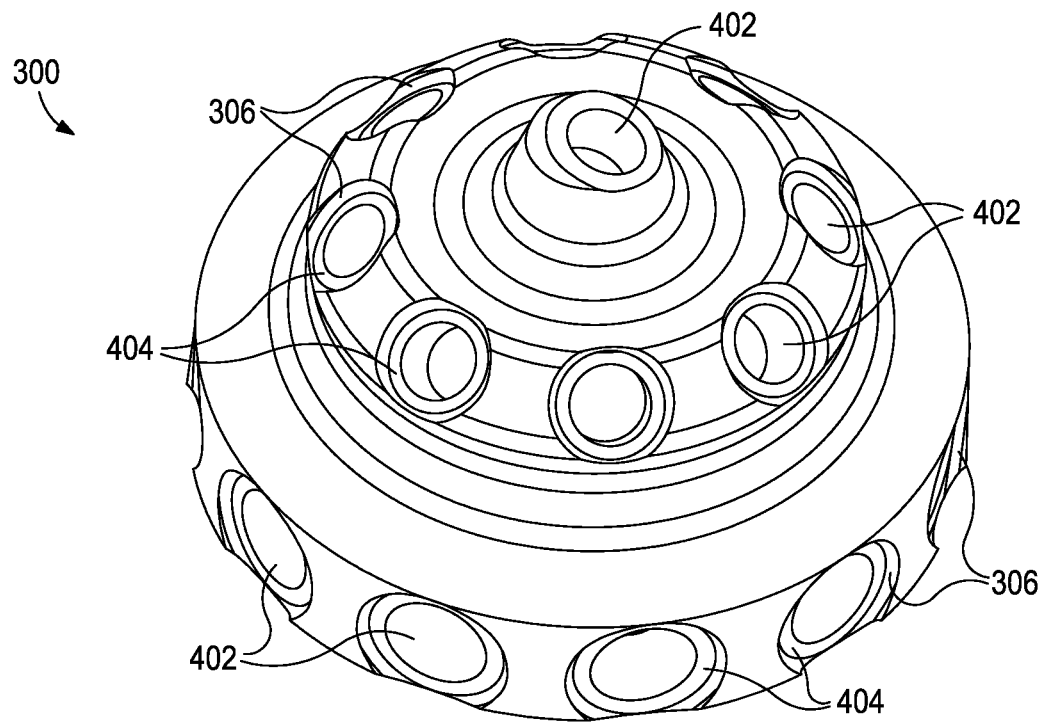
FIG. 4 is another isometric side view of the example cone blank of FIG. 3 demonstrating additional example manufacturing of the roller cone in accordance with embodiments of the present disclosure.

FIG. 4 is another isometric side view of the example cone blank 300 demonstrating additional example manufacturing of the roller cone in accordance with embodiments of the present disclosure. Following quenching, corresponding insert holes 402 may be drilled at each exposed recess 306 to accommodate respective inserts (not shown). Each insert hole 402 may be defined at a corresponding recess 306 and may exhibit a diameter slightly smaller than the diameter of the recess 306. In some embodiments, this may result in the generation of an annular shoulder 404 that circumscribes the corresponding insert hole 402 and radially interposes the outer circumference of the corresponding recess 306 and the insert hole 402.

Figure 5:
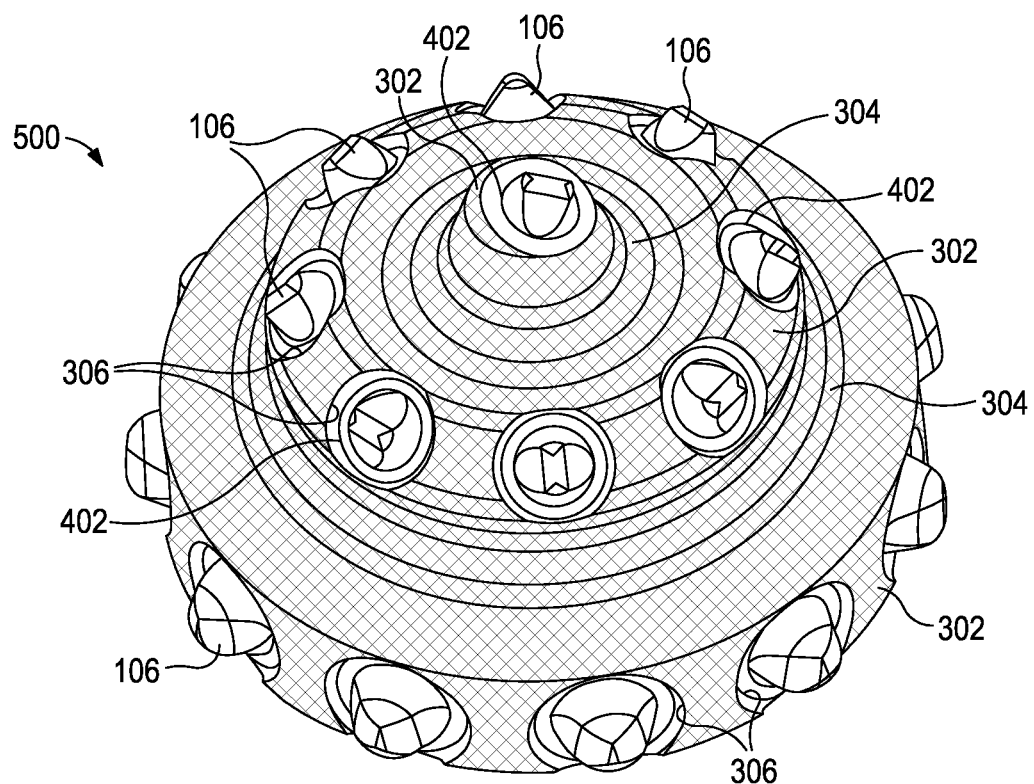
FIG. 5 is an isometric view of an example roller cone manufactured from the cone blank of FIG. 3 and in accordance with the presently disclosed methods.

FIG. 5 is an isometric view of an example roller cone 500 manufactured from the cone blank 300 of FIG. 3 and in accordance with one or more aspects of the presently disclosed methods. As illustrated, the roller cone 500 includes the land surfaces 302 and the insert grooves 304. A plurality of inserts 106 are received within the corresponding insert holes 402 defined in the body of the roller cone 500 at corresponding recesses 306. Since the insert holes 402 exhibit a diameter slightly smaller than the diameter of the corresponding recess 306, once the insert 106 is received within the insert hole 402, the corresponding annular shoulder 404 (FIG. 4) forms a groove that circumscribes the associated insert 106.

Accordingly, except for the exposed portions of the recesses 306 and the annular shoulders 404 (FIG. 4) that circumscribe the corresponding inserts 106, the roller cone 500 may comprise a fully surface-hardened cone shell. In contrast to conventional roller cones, the land surfaces 302 in the roller cone 500 have an increased surface hardness capable of reducing wear and erosion at the land surfaces 302, which helps to retain the inserts 106 for longer useful operational life.

Figure 6:
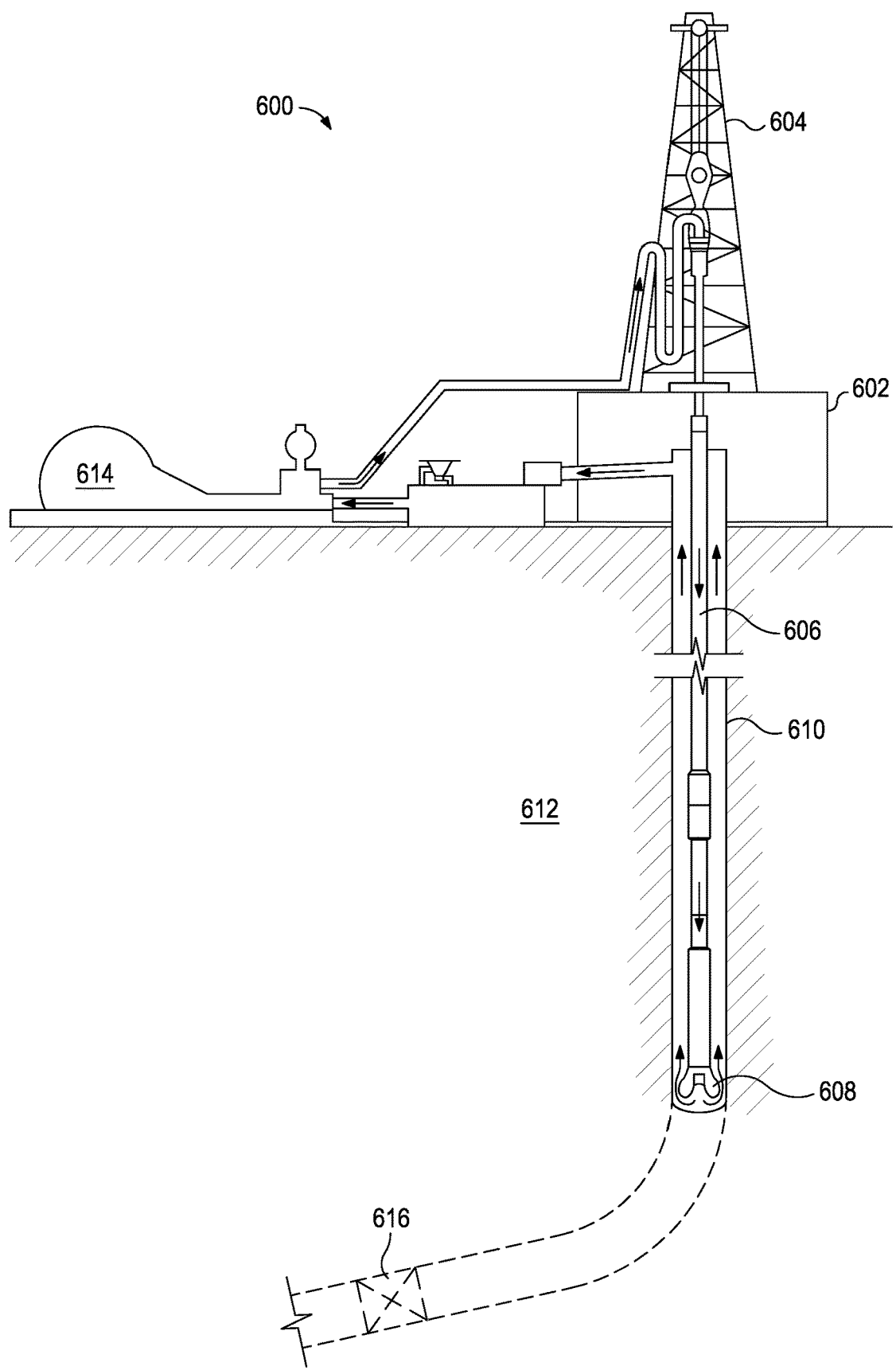
FIG. 6 is an example drilling system that may employ the principles of the present disclosure.

FIG. 6 is an example drilling system 600 that may employ the principles of the present disclosure. While FIG. 6 generally depicts a land-based drilling assembly, the principles described herein are equally applicable to subsea or offshore drilling operations, without departing from the scope of the disclosure. As illustrated, the drilling system 600 includes a drilling platform 602 that supports a derrick 604 operable to raise and lower a drill string 606. The drill string 606 can comprise drill pipe or coiled tubing, as generally known in the art.

A drill bit 608 is attached to the distal end of the drill string 606 and is driven in rotation either by a downhole motor and/or via rotation of the drill string 606 from the well surface. The drill bit 608 may comprise, for example, a roller cone drill bit that incorporates the presently disclosed methods of manufacturing. Accordingly, the drill bit 608 may include one or more roller cones similar to the roller cone 500 of FIG. 5.

As the drill bit 608 rotates, it creates a borehole or wellbore 610 that penetrates various subterranean formations 612. A pump 614 (e.g., a mud pump) circulates drilling fluid through the interior of the drill string 606, and the drilling fluid is ejected out one or more orifices in the drill bit 608. The drilling fluid is then circulated back to the surface via the annulus defined between the drill string 606 and the walls of the wellbore 610, conveying with it rock and debris created during the drilling process. As the drill bit 608 operates, the length of the wellbore 610 extends.

In some embodiments, the wellbore 610 may be drilled and one or more downhole obstructions 616 (one shown in dashed lines) may be secured within the wellbore 610 at predetermined locations. In such embodiments, the drill bit 608 may be used to drill or mill through the downhole obstruction 616, and thereby clear a path through the wellbore 610 at that location. The downhole obstruction 616 may comprise, for example, a bridge plug, a frac plug, a wellbore packer, any combination thereof, or any downhole tool or device that may be deployed within the wellbore 610 and that is drillable using the drill bit 608.

Embodiments disclosed herein include:

A. A method of manufacturing a roller cone includes machining a cone blank and thereby defining one or more land surfaces and one or more insert grooves on the cone blank, surface hardening the cone blank, milling a plurality of recesses into at least one of the one or more land surfaces, subjecting the cone blank to a quenching process, forming an insert hole at each recess, and inserting an insert into each insert hole.

B. A roller cone includes a cone blank that defines one or more land surfaces and one or more insert grooves, a plurality of recesses milled into at least one of the one or more land surfaces, an insert hole defined at each recess, and an insert received within each insert hole, wherein the cone blank is surface hardened prior to milling the plurality of recesses, and wherein the cone blank is subjected to a quenching process prior to defining the insert holes at each recess and after the plurality of recesses is milled.

C. A method of drilling includes lowering a drill bit into a wellbore, the drill bit comprising a roller cone drill bit having a plurality of roller cones, and each roller cone comprising a cone blank that defines one or more land surfaces and one or more insert grooves, a plurality of recesses milled into at least one of the one or more land surfaces, an insert hole defined at each recess, and an insert received within each insert hole, wherein the cone blank is surface hardened prior to milling the plurality of recesses, and wherein the cone blank is subjected to a quenching process prior to defining the insert holes at each recess and after the plurality of recesses is milled. The method further including rotating the drill bit within the wellbore.

Each of embodiments A, B, and C may have one or more of the following additional elements in any combination: Element 1: wherein surface hardening the cone blank comprises subjecting the cone blank to a process selected from the group consisting of carburization, nitriding, cyaniding, induction hardening, flame hardening, laser hardening, and any combination thereof. Element 2: wherein milling the plurality of recesses into at the least one of the one or more land surfaces comprises removing a layer of surface hardened material at a location of each recess on the least one of the one or more land surfaces. Element 3: wherein milling the plurality of recesses into at the least one of the one or more land surfaces comprises milling the at the least one of the one or more land surfaces at locations where an insert will be attached to the cone blank. Element 4: wherein each recess comprises a circular, flat depression extending a short distance into the cone blank. Element 5: wherein forming the insert hole at each recess comprises drilling the insert hole at each recess. Element 6: wherein inserting the insert into each insert hole further comprises press-fitting, welding, or brazing the insert into each insert hole. Element 7: wherein each insert hole exhibits a diameter smaller than a diameter of a corresponding recess of the plurality of recesses.

Element 8: wherein the cone blank is surface hardened via a process selected from the group consisting of carburization, nitriding, cyaniding, induction hardening, flame hardening, laser hardening, and any combination thereof. Element 9: wherein each recess comprises a circular, flat depression extending a short distance into the cone blank. Element 10: wherein each insert hole is drilled at a corresponding recess. Element 11: wherein the inserts are received into corresponding insert holes via a process selected from the group consisting of press-fitting, welding, or brazing the insert into each insert hole. Element 12: wherein each insert hole exhibits a diameter smaller than a diameter of a corresponding recess.

Element 13: wherein rotating the drill bit within the wellbore comprises drilling a portion of the wellbore with the drill bit and thereby extending a length of the wellbore. Element 14: wherein rotating the drill bit within the wellbore comprises drilling through a downhole obstruction located within the wellbore with the drill bit. Element 15: wherein each recess comprises a circular, flat depression extending a short distance into the cone blank. Element 16: wherein the inserts are received into corresponding insert holes via a process selected from the group consisting of press-fitting, welding, or brazing the insert into each insert hole. Element 17: wherein each insert hole exhibits a diameter smaller than a diameter of a corresponding recess.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:
1. A method of manufacturing a roller cone, comprising:
   machining a cone blank and thereby defining one or more land surfaces and one or more insert grooves on the cone blank;
   surface hardening the cone blank;
   milling a plurality of recesses into at least one of the one or more land surfaces after surface hardening the cone blank;
   subjecting the cone blank to a quenching process after milling the plurality of recesses;

forming an insert hole at each recess after quenching the cone blank; and inserting an insert into each insert hole.

2. The method of claim 1, wherein surface hardening the cone blank comprises subjecting the cone blank to a process selected from the group consisting of carburization, nitriding, cyaniding, induction hardening, flame hardening, laser hardening, and any combination thereof.

3. The method of claim 1, wherein milling the plurality of recesses into at the least one of the one or more land surfaces comprises removing a layer of surface hardened material at a location of each recess on the least one of the one or more land surfaces.

4. The method of claim 1, wherein milling the plurality of recesses into at the least one of the one or more land surfaces comprises milling the at the least one of the one or more land surfaces at locations where an insert will be attached to the cone blank.

5. The method of claim 1, wherein each recess comprises a circular, flat depression extending a short distance into the cone blank.

6. The method of claim 1, wherein forming the insert hole at each recess comprises drilling the insert hole at each recess.

7. The method of claim 1, wherein inserting the insert into each insert hole further comprises press-fitting, welding, or brazing the insert into each insert hole.

8. The method of claim 1, wherein each insert hole exhibits a diameter smaller than a diameter of a corresponding recess of the plurality of recesses.

9. A roller cone, comprising:
a cone blank that defines one or more land surfaces and one or more insert grooves;
a plurality of recesses milled into at least one of the one or more land surfaces;
an insert hole defined at each recess; and
an insert received within each insert hole,
wherein the cone blank is surface hardened prior to milling the plurality of recesses, and
wherein the cone blank is subjected to a quenching process prior to defining the insert holes at each recess and after the plurality of recesses is milled.

10. The roller cone of claim 9, wherein the cone blank is surface hardened via a process selected from the group consisting of carburization, nitriding, cyaniding, induction hardening, flame hardening, laser hardening, and any combination thereof.

11. The roller cone of claim 9, wherein each recess comprises a circular, flat depression extending a short distance into the cone blank.

12. The roller cone of claim 9, wherein each insert hole is drilled at a corresponding recess.

13. The roller cone of claim 9, wherein the inserts are received into corresponding insert holes via a process selected from the group consisting of press-fitting, welding, or brazing the insert into each insert hole.

14. The roller cone of claim 9, wherein each insert hole exhibits a diameter smaller than a diameter of a corresponding recess.

15. A method of drilling, comprising:
lowering a drill bit into a wellbore, the drill bit comprising a roller cone drill bit having a plurality of roller cones, and each roller cone comprising:
a cone blank that defines one or more land surfaces and one or more insert grooves;
a plurality of recesses milled into at least one of the one or more land surfaces;
an insert hole defined at each recess; and
an insert received within each insert hole, wherein the cone blank is surface hardened prior to milling the plurality of recesses, and wherein the cone blank is subjected to a quenching process prior to defining the insert holes at each recess and after the plurality of recesses is milled;
rotating the drill bit within the wellbore.

16. The method of claim 15, wherein rotating the drill bit within the wellbore comprises drilling a portion of the wellbore with the drill bit and thereby extending a length of the wellbore.

17. The method of claim 15, wherein rotating the drill bit within the wellbore comprises drilling through a downhole obstruction located within the wellbore with the drill bit.

18. The method of claim 15, wherein each recess comprises a circular, flat depression extending a short distance into the cone blank.

19. The method of claim 15, wherein the inserts are received into corresponding insert holes via a process selected from the group consisting of press-fitting, welding, or brazing the insert into each insert hole.

20. The method of claim 15, wherein each insert hole exhibits a diameter smaller than a diameter of a corresponding recess.

21. A method of manufacturing a roller cone, comprising:
machining a cone blank and thereby defining one or more land surfaces and one or more insert grooves on the cone blank;
surface hardening the cone blank;
milling a plurality of recesses into at least one of the one or more land surfaces;
subjecting the cone blank to a quenching process;
forming an insert hole at each recess, each insert hole exhibiting a diameter smaller than a diameter of a corresponding recess of the plurality of recesses; and
inserting an insert into each insert hole.

* * * * *